(12) United States Patent
Van Staden et al.

(10) Patent No.: US 11,030,661 B2
(45) Date of Patent: Jun. 8, 2021

(54) OPT-OUT ENFORCEMENT FOR SYSTEMS USING NON-COOKIE BROWSER IDENTIFICATION

(71) Applicants: Jurgen Van Staden, New York, NY (US); Justin Davis, Portland, ME (US)

(72) Inventors: Jurgen Van Staden, New York, NY (US); Justin Davis, Portland, ME (US)

(73) Assignee: NETWORK ADVERTISING INITIATIVE INC., Washington, DC (US)

( * ) Notice: Subject to any disclaimer, the term of this patent is extended or adjusted under 35 U.S.C. 154(b) by 0 days.

(21) Appl. No.: 16/205,360

(22) Filed: Nov. 30, 2018

(65) Prior Publication Data

US 2019/0180331 A1 Jun. 13, 2019

Related U.S. Application Data

(62) Division of application No. 15/159,753, filed on May 19, 2016, now Pat. No. 10,148,792.

(60) Provisional application No. 62/164,511, filed on May 20, 2015.

(51) Int. Cl.
| | |
|---|---|
| *H04L 29/08* | (2006.01) |
| *H04L 29/06* | (2006.01) |
| *G06F 21/78* | (2013.01) |
| *G06F 21/54* | (2013.01) |
| *G06Q 30/02* | (2012.01) |
| *G06Q 10/00* | (2012.01) |

(52) U.S. Cl.
CPC ..... *G06Q 30/0277* (2013.01); *H04L 63/0876* (2013.01); *H04L 67/02* (2013.01); *H04L 67/141* (2013.01)

(58) Field of Classification Search
USPC ....... 709/203, 224, 218, 217, 227, 223, 246, 709/225, 226, 229
See application file for complete search history.

(56) References Cited

U.S. PATENT DOCUMENTS

| | | | | |
|---|---|---|---|---|
| 9,641,632 | B1* | 5/2017 | Torrance | H04L 67/22 |
| 10,148,792 | B1* | 12/2018 | Van Staden | H04L 67/141 |
| 2004/0088363 | A1* | 5/2004 | Doemling | H04L 69/329 709/207 |
| 2010/0049790 | A1* | 2/2010 | Schreiber | G06F 9/454 709/203 |
| 2010/0262498 | A1* | 10/2010 | Nolet | G06Q 30/0251 705/14.71 |
| 2011/0231242 | A1* | 9/2011 | Dilling | G06Q 30/0243 705/14.42 |
| 2011/0314092 | A1* | 12/2011 | Lunt | H04L 67/10 709/203 |
| 2013/0046855 | A1* | 2/2013 | Jiang | H04L 67/02 709/218 |

(Continued)

*Primary Examiner* — Jude Jean Gilles
(74) *Attorney, Agent, or Firm* — John M. Behles (57) ABSTRACT

Systems and methods for opt-out enforcement for systems using non-cookie browser identification are provided herein. An example method includes requesting a session trust cookie for a client, the session trust cookie being generated by an end point system, creating a "from visited" context between the client and the end point system as if the end point system had been visited by the client, and setting, by the end point system, the session trust cookie.

19 Claims, 10 Drawing Sheets

(56) References Cited

U.S. PATENT DOCUMENTS

| | | | |
|---|---|---|---|
| 2013/0212638 A1* | 8/2013 | Wilson | G06Q 50/26 726/1 |
| 2014/0245134 A1* | 8/2014 | Portnoy | G06F 9/451 715/240 |
| 2015/0350173 A1* | 12/2015 | Tanase | H04L 63/08 726/7 |

* cited by examiner

OPT-OUT ENFORCEMENT FOR SYSTEMS USING NON-COOKIE BROWSER IDENTIFICATION

CROSS REFERENCE TO RELATED APPLICATIONS

This non-provisional application is a divisional of U.S. application Ser. No. 15/159,753, filed on May 19, 2016, which claims the benefit and priority of U.S. Provisional Application Ser. No. 62/164,511, filed on May 20, 2015, all of which are hereby incorporated by reference herein in their entireties, including all references and appendices cited therein.

FIELD OF THE PRESENT DISCLOSURE

The present disclosure relates generally to data privacy and enforcement of opt-out methodologies, and more specifically, but not by way of limitation, to systems and methods that allow for enforcement of opt-out features when advertisers are utilizing non-cookie browser identification processes, such as, but not limited to, statistical identifiers or digital fingerprints, local storage objects and other similar methods.

SUMMARY

According to some embodiments, the present disclosure is directed to methods that comprise: (a) requesting a session trust cookie for a client, the session trust cookie being generated by an end point system; (b) creating a "from visited" context between the client and the end point system as if the end point system had been visited by the client; and (c) setting, by the end point system, the session trust cookie.

According to some embodiments, the present disclosure is directed to methods that comprise: (a) gaining trust of a browser of a client by setting a first session cookie; (b) instantiating, by a server, an iFrame on the browser; and (c) iterating through a plurality of end point systems through the iFrame so as to allow each of the plurality of end point systems to set a second trusted opt-out cookie on the browser of the client.

According to some embodiments, the present disclosure is directed to methods that comprise: (a) executing an onboarding process by delivering to an end point system a means for specifying if the end point system is using non-cookie tracking technology, as well as opt-out cookies; (b) receiving from the end point system any of opt-out cookie values, end point system URL, privacy policy URL, a description of a company associated with the end point system, and an advertisement ID rotation URL; (c) receiving end point details specify an opt-out infrastructure for the end point system; (d) performing a baseline test of the end point system's capabilities to provide opt-out features; and (e) notifying the end point system of approval or disapproval based on the baseline test.

BRIEF DESCRIPTION OF THE DRAWINGS

The accompanying drawings, where like reference numerals refer to identical or functionally similar elements throughout the separate views, together with the detailed description below, are incorporated in and form part of the specification, and serve to further illustrate embodiments of concepts that include the claimed disclosure, and explain various principles and advantages of those embodiments.

The methods and systems disclosed herein have been represented where appropriate by conventional symbols in the drawings, showing only those specific details that are pertinent to understanding the embodiments of the present disclosure so as not to obscure the disclosure with details that will be readily apparent to those of ordinary skill in the art having the benefit of the description herein.

DESCRIPTION OF EXAMPLE EMBODIMENTS

Interest-based advertising is the collection of data about a user's online activity, over time and relative to various digital properties, for the purpose of delivering targeted advertising to such users. Advertising is targeted to the user based on the user's interests (or inferred/deduced interests). In some embodiments these interests can be determined from an identification of a browser by way of a computation of data elements that yield statistical identifiers. In other embodiments these interests can be determined by utilizing some other form of browser identification such as local stored objects. Once the browser type is identified, the advertiser can evaluate the user's activity for interest categories or other marketable characteristics.

In some embodiments, users desire not to be targeted with interest-based advertising. To these ends, advertisers, along with non-governmental regulatory bodies, have developed robust procedures to ensure that users can "opt-out" of interest-based advertising (also known as online-behavioral advertising). One example protocol for allowing users to opt-out includes the use of opt-out cookies, which are placed on the user's client to inform the advertiser that this particular client has opted out of interest-based advertising.

The user must request opt-out cookies from each advertiser. Some advertisers do not participate in opt-out processes. Of those that do, many voluntarily belong to enforcement agencies such as the Network Advertising Initiative™ (NAI), which is a regulatory body that sets robust standards for data privacy and digital protection standards.

While these opt-out cookie procedures are beneficial, advertisers are becoming more sophisticated. Advertisers are utilizing other browser identification methodologies such as the use of statistical identifiers and HTML 5 local storage objects, to identify a browser regardless of the ability to use HTTP cookies. Some of these methods are broadly categorized as "digital fingerprinting" of browsers or non-cookie identification technologies. Thus, a need exists for systems and methods that allow for the enforcement of consumers' opt-out choices when these digital fingerprinting and other non-cookie technologies are used for targeting methodologies and particularly interest based advertising.

Broadly, the present disclosure is directed to systems and methods that allow consumers to see a presence/status of the use of non-cookie technologies for interest-based advertising on their browser and request opt-outs from interest-based advertising when advertisers are using a non-cookie technology (such as digital fingerprinting) as opposed to HTTP cookie-based identification. Also, the present disclosure delivers to consumers, verified opt-out information such as an identification of advertisers using non-cookie technologies (such as digital fingerprints or other server-side browser identification technologies) and the status of the use of the non-cookie technologies for interest-based advertising following an opt-out event. Using the systems and methods of the present disclosure, users can also request an opt-out from advertisers active within the system and verification of their opt-out status with each advertiser, referred to as an end point system.

These and other advantages of the present disclosure are provided in greater detail with reference to the drawings.

Figure 1:
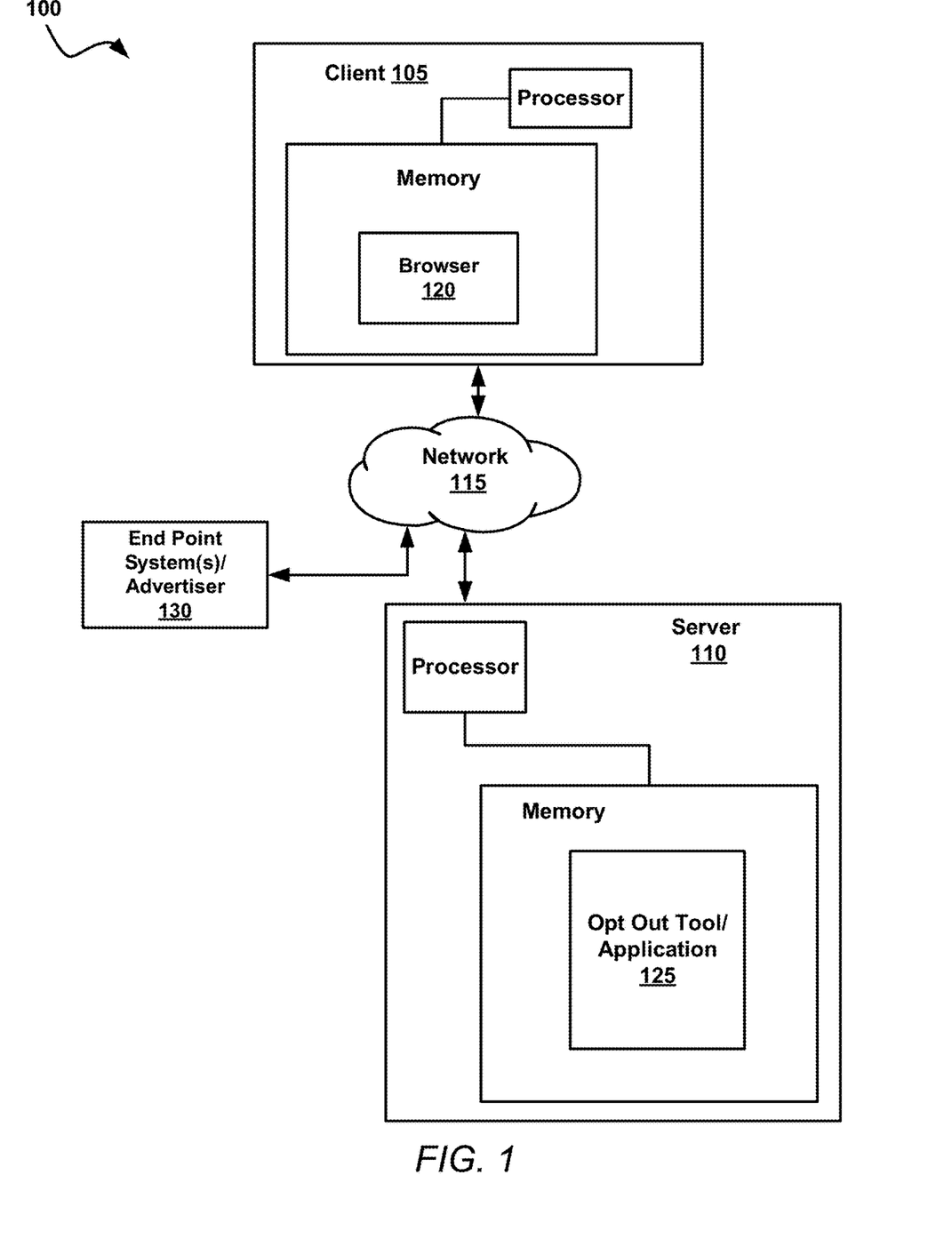
FIG. 1 is a schematic diagram of an example computing architecture for use in accordance with the present disclosure.

FIG. 1 is a block diagram of an example architecture 100 in which embodiments of the present disclosure may be practiced. According to some embodiments, the architecture 100 may comprise a client 105, which in some instances may comprise an end user computing device, a mobile computing device, or any other device capable of displaying graphical user interfaces ("GUIs") and allowing an end user to interact with such GUIs. Each client 105 executes a local browser application (hereinafter "browser 120") that is utilized to access network resources such as web sites and web pages.

To perform an opt-out request or verification process, the client 105 may communicatively couple with a server 110 via a network 115, which may comprise a local area network ("LAN"), a wide area network ("WAN"), or any other private or public network, such as the Internet. The network 115 may also comprise any suitable telecommunications network. The network 115 can include multiple distinct networks used by any of the devices disclosed herein.

Figure 10:
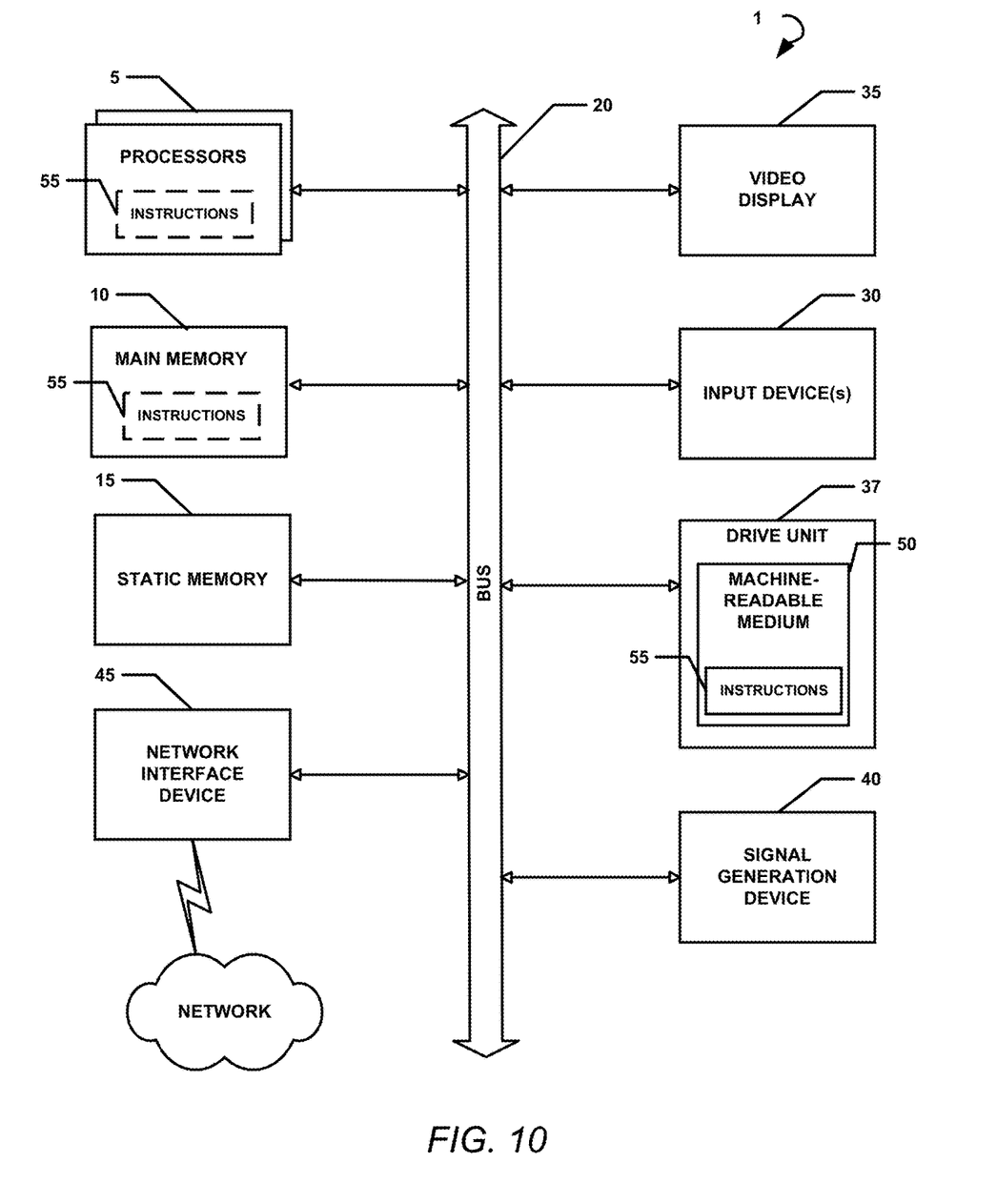
FIG. 10 is a schematic diagram of an example computing system that can be used to implement aspects of the present disclosure.

According to some embodiments, the server 110 may comprise any computing device, such as the computing device 1 of FIG. 10. The server 110 includes one or more processors such as the one or more processors 5 of FIG. 10, and memory for storing executable instructions (e.g., logic) such as the main memory 10 of computing device 1. This logic, when executed by the one or more processors, is operable to perform operations, including the example methods described herein.

In some instances, the functions of the server 110 may be implemented within a cloud-based computing environment. In general, a cloud-based computing environment is a resource that typically combines the computational power of a large model of processors and/or that combines the storage capacity of a large model of computer memories or storage devices. For example, systems that provide a cloud resource may be utilized exclusively by their owners; or such systems may be accessible to outside users who deploy applications within the computing infrastructure to obtain the benefit of large computational or storage resources.

The cloud may be formed, for example, by a network of servers, with each server (or at least a plurality thereof) providing processor and/or storage resources. These servers may manage workloads provided by multiple users (e.g., cloud resource consumers or other users). Typically, each user places workload demands upon the cloud that vary in real-time, sometimes dramatically. The nature and extent of these variations typically depend on the type of business associated with the user.

A module (or application), as referenced in the present disclosure, should be generally understood as a collection of routines that perform various system-level functions and may be dynamically loaded and unloaded by hardware and device drivers as required. The modular software components described herein may also be incorporated as part of a larger software platform or integrated as part of an application specific component. As used herein, the term "module" may also refer to any of an application-specific integrated circuit ("ASIC"), an electronic circuit, a processor (shared, dedicated, or group) that executes one or more software or firmware programs, a combinational logic circuit, and/or other suitable components that provide the described functionality.

According to some embodiments, the server 110 may execute logic stored in memory to facilitate a method for determining an opt-out status of a client with one or more advertisers, referred to as end points. In some embodiments, the server 110 implements an opt-out tool or application 125 for placement a client's browser for opting out of interest-based advertising, or verifying that placement has taken place.

Prior to allowing clients to opt-out of interest-based advertising, it is advantageous to allow advertisers to implement a process whereby the advertiser is capable of responding to opt-out requests from clients. To be sure, advertisers that desire to provide the opt-out fulfillment and verification processes described herein can utilize the following process illustrated in FIG. 2, which includes a method for implementing an opt-out procedure by an advertiser.

Figure 2:
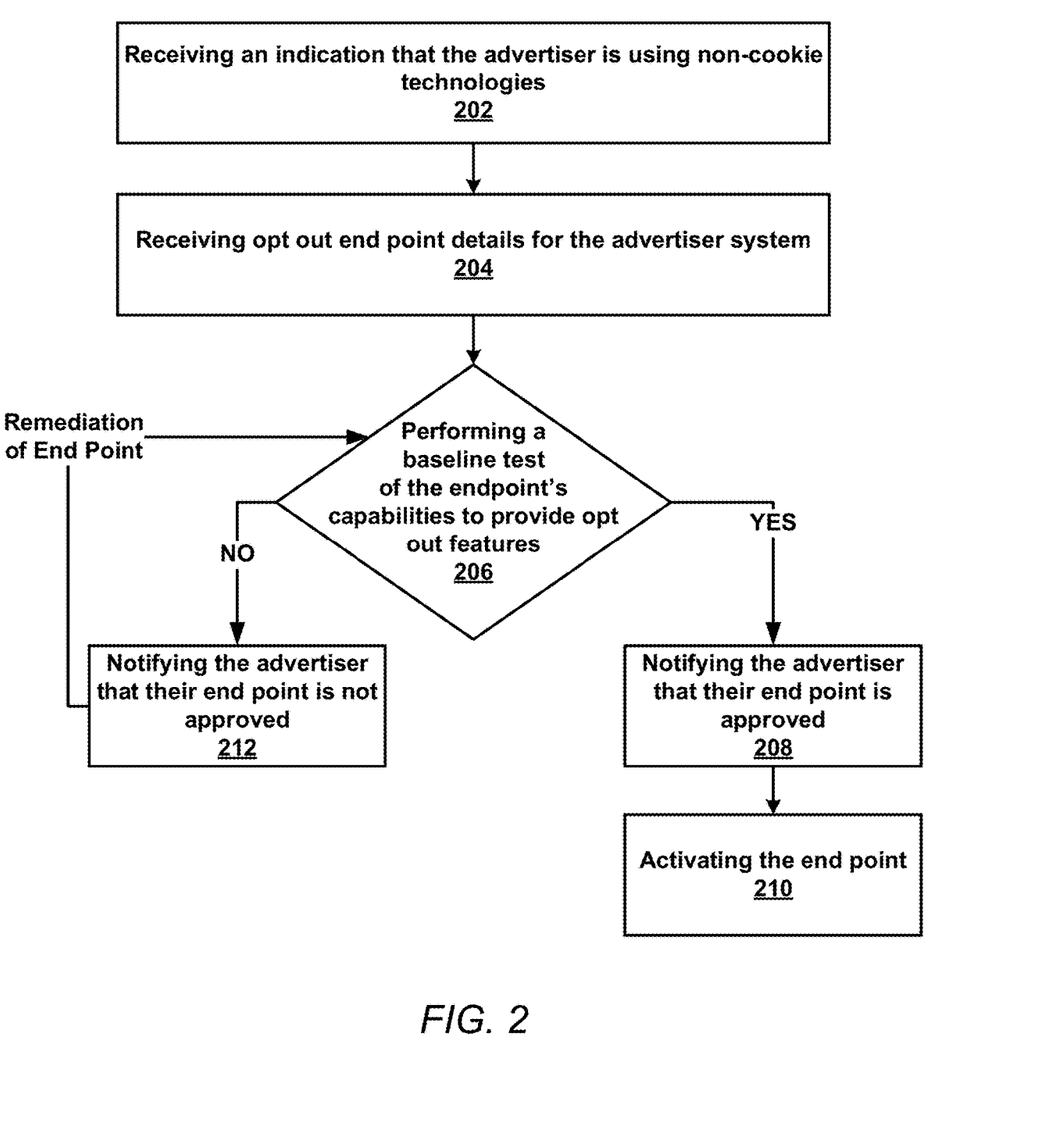
FIG. 2 is a flowchart of an example method for a method for implementing an opt-out procedure by an advertiser.

In some embodiments, the method includes the server 110 executing an onboarding process by delivering to the advertiser a means for specifying if they are using non-cookie tracking technology (e.g., digital fingerprinting), as well as cookie technologies. In some embodiments, the server 110 provides a web-form that allows the advertiser to specify their tracking methodological details.

Figure 3:
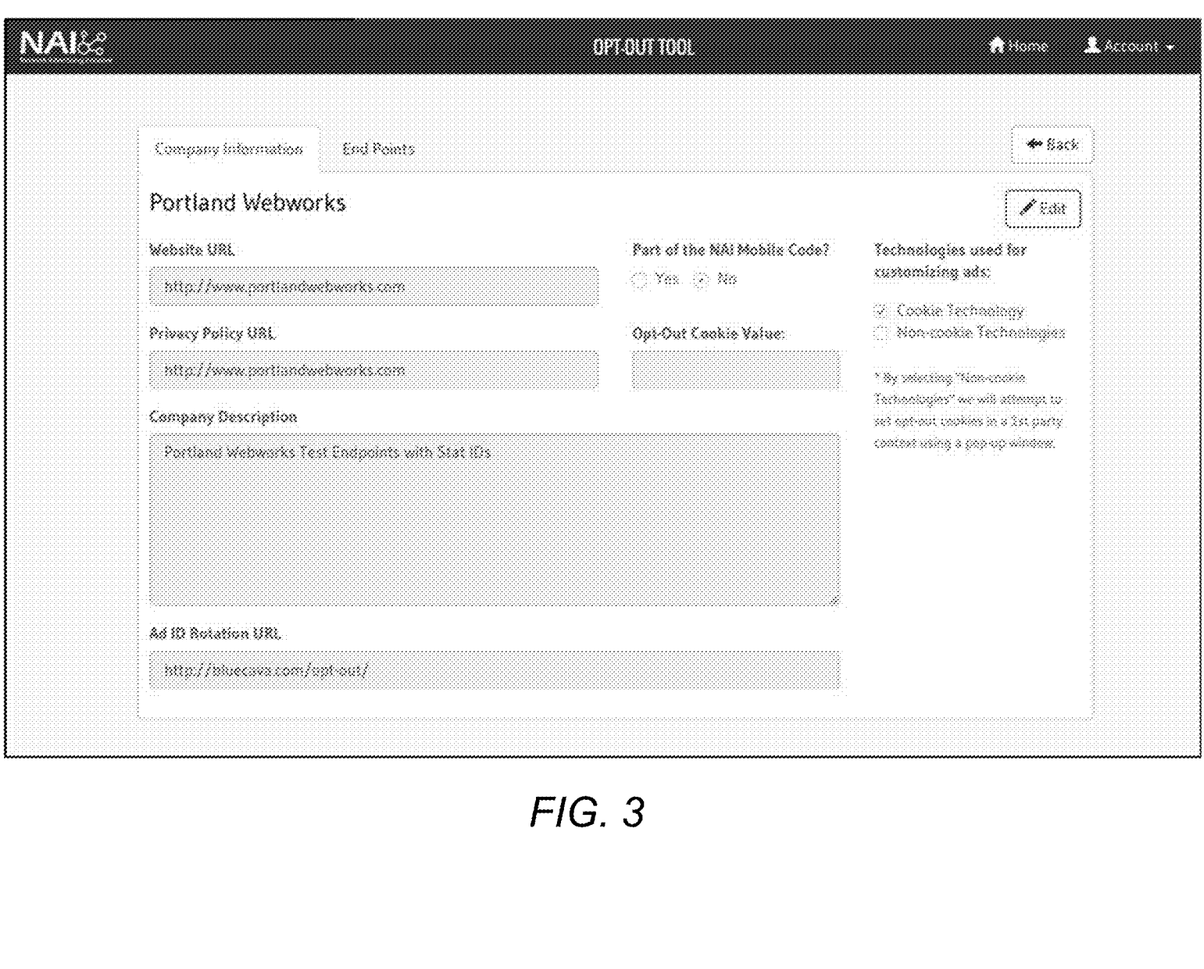
FIG. 3 is an example GUI of a web form for receiving information from an advertiser.

To be sure, the advertiser is providing these details so that the server 110 can fulfill requests for opt-out selection by clients and verification from advertiser system end points, as will be discussed in greater detail below. In some embodiments, the method includes the server receiving 202 an indication that the advertiser is using non-cookie technologies. For example, the advertiser can check a box provided on a GUI that indicates that they are using non-cookie technologies to identify end users/devices, referred to as clients. The advertiser can also be required to input their opt-out cookie values, along with other information such as the advertiser URL (opt out end point URL), their privacy policy URL, a description of the company, and an advertisement ID rotation URL—just to name a few. An example web form is illustrated in FIG. 3.

Figure 4:
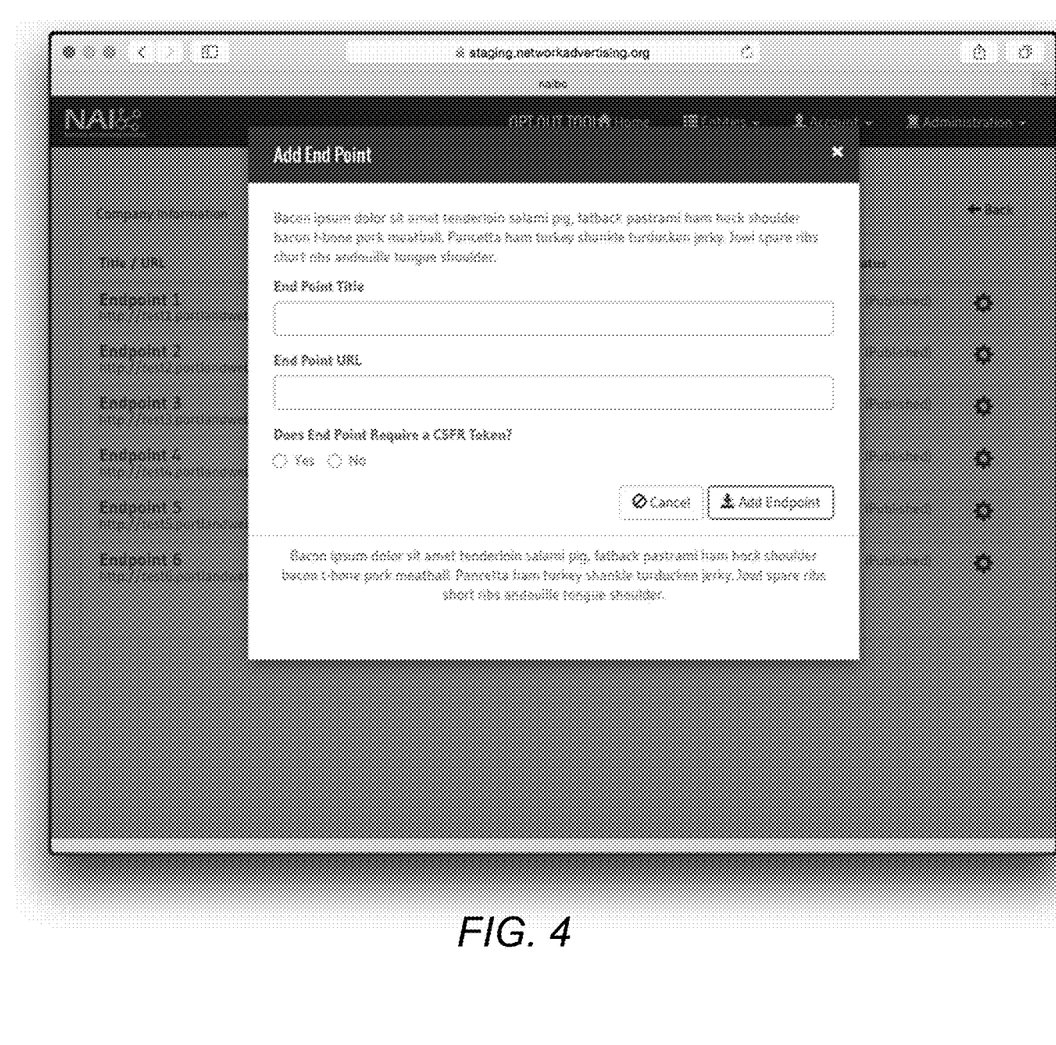
FIG. 4 is an example GUI of a web form that allows an advertiser to input their end point details.

In some embodiments, the method includes the server 110 receiving 204 opt-out end point details for the advertiser system. These end-point details specify the opt-out location for the advertiser systems. The advertiser can input their opt-out end point details in a web-form such as the web-form of FIG. 4.

According to some embodiments, the method includes an optional step of the server 110 performing 206 a baseline test of the endpoint's capabilities to provide opt-out features as set forth in the data gathering steps specified above.

If the end point is successfully verified, the method includes a step of notifying 208 the advertiser that their end point is approved. The method includes the server 110 activating 210 the end point. If the end point is not successfully verified, the method includes a step of notifying 212 the advertiser that their end point is not approved. Remediation of errors can occur until the end point is successfully verified.

Figure 5:
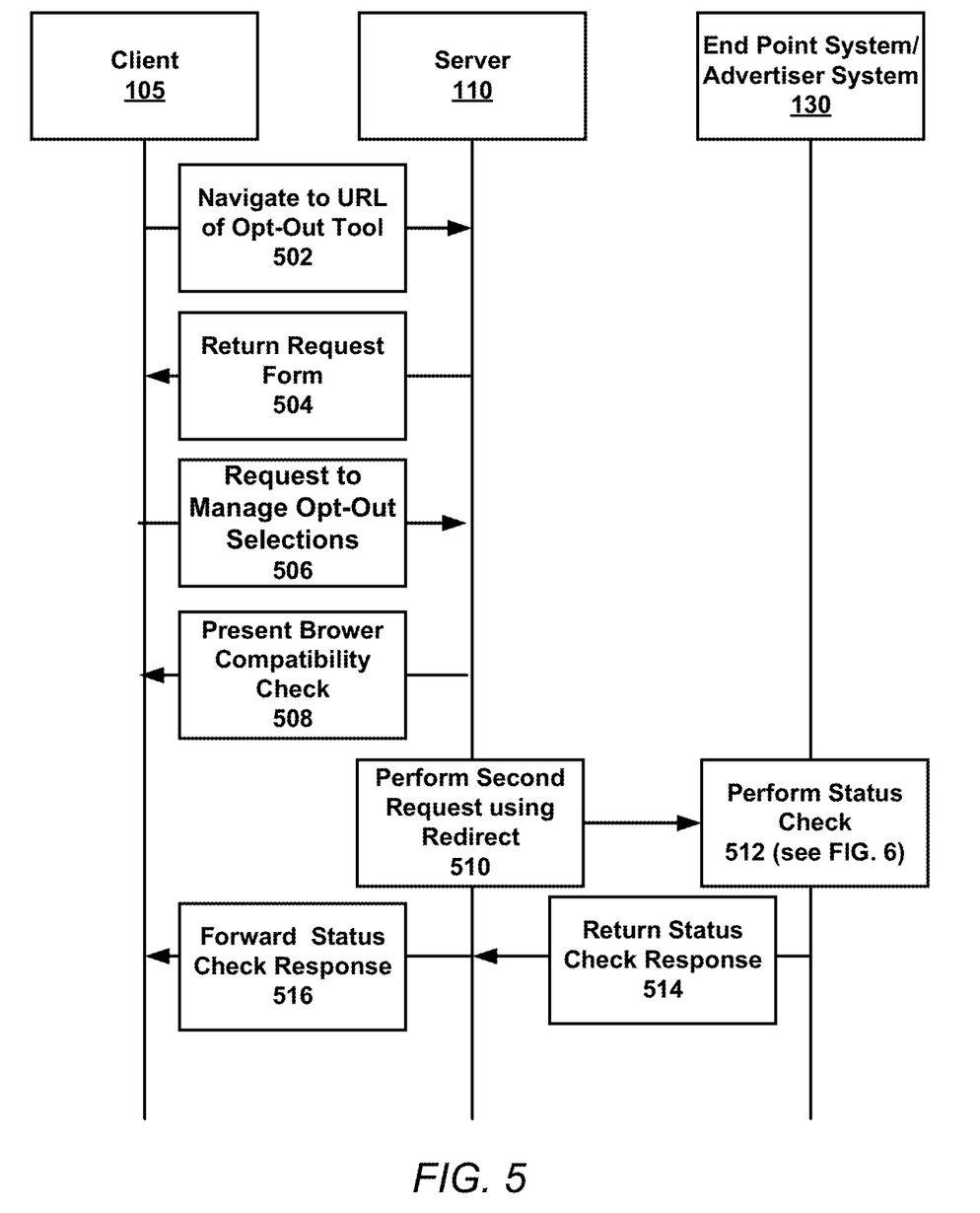
FIG. 5 is a signal flow diagram of an opt-out enrollment/verification process of the present disclosure.

Referring now to FIG. 5, a signal flow diagram of an opt-out end point enrollment/verification process is illustrated.

Generally, FIG. 5 illustrates a process whereby a client 105 can verify the use of non-cookie tracking technologies used by advertiser systems 130. Initially, the client 105 navigates 502 to a URL hosted by the server 110. This URL is accessed using a browser of the client. The resource at the URL is an opt-out tool/application hosted by the server 110. In general, the tool/application is adapted to determine the presence of a non-cookie tracking technology on the browser of the client 105 which has been used by an advertiser to track the client 105.

The server 110 returns 504 a GUI that allows the user to see the presence of use of non-cookie technologies by the advertiser systems 130. After obtaining a status from the tool/application related to the use of non-cookie tracking technologies, the server 110 allows the client 105 to manage their opt-out requests using the same tool/application. For example, assume the server 110 reveals which participating advertisers currently are using a non-cookie technology to identify a client's browser and enables the user to specify which advertisers it would like to opt-out of receiving targeted advertisements from.

In other embodiments, the client 105 can request that an opt-out be obtained from every advertiser system.

In some embodiments, the client 105 selects a management of opt-outs, as illustrated in request 506. The server 110 can then conduct a status check 508, which includes a browser compatibility check and a determination as to whether the browser's configuration is sufficient to allow the tool to obtain the tracking status of the non-cookie identification technologies that each participating advertiser may be using to identify the browser. To be sure, the client can utilize the present disclosure to opt out of interest based advertising in an agnostic manner with respect to the browser technology utilized by the client. The client can request the opt-out of interest based advertising using the present method, regardless of the exact type of non-cookie tracking processes used by the advertiser.

In some embodiments, the server 110 is configured to determine browser rules associated with the browser identified in the status check. This can include the server 110 connecting the client's browser with each of a plurality of participating advertiser systems, such as advertiser system 130.

An example method includes the server 110 redirecting the browser through an HTTP 302 redirect process 510. An HTTP 302 redirect is a process that invites the browser by a response to make a second (or numerous depending on the number of advertiser systems), otherwise identical, request to a new URL specified in the location field of the redirect (which points to the opt-out end point advertiser systems(s)).

Next, each of the opt-out end point advertiser systems 130 performs a status check process 512 with server 110. Again, this process is illustrated and described in greater detail in FIG. 6. Each of the opt-out end point advertiser systems providing the required status check process is configured to generate various responses in reply to a status check request received through the HTTP 302 redirect method.

In some embodiments, the agency implementing the server 110 will create a response algorithm or schema that allows each advertiser to respond appropriately to status requests. In one example, the server 110 can transmit to an advertiser system 130 an other-status request. The advertiser system 130 can respond with an other-status response value. An example response from the advertiser system includes:

URL: <rd>/token/<participant_id>/<cookie-status>-<other-status>/<token>

The other-status token refers to non-cookie tracking/identification technologies. The token field could include various response values such as (0) for not applicable; (1) no non-cookie present for the browser/client; (2) non-cookie IBA (Interest Based Advertising) identifier present for the browser/client; and (3) non-cookie opt-out present for the browser/client.

Additional response values can include those listed in Table 1.

TABLE 1

| Field | Data Type | Description |
|---|---|---|
| rd | string | rd value from request |
| participant_id | integer | participant_id value from request |
| cookie-status | integer | 0 = Unidentified Failure Occurred<br>1 = No IBA cookie(s) from Member on the browser<br>2 = IBA cookie(s) from Member present on the browser.<br>3 = Opt-out cookie is present on the browser. |
| other-status | integer | 0 = Unidentified Failure Occurred<br>1 = No Non-Cookie IBA Identifier from Participant present for the browser<br>2 = Non-Cookie IBA Identifier from Participant present for the browser. |
| token | string | optional Anti-CSRF string, Must be valid ASCII characters allowed in a URL. |

Figure 6:
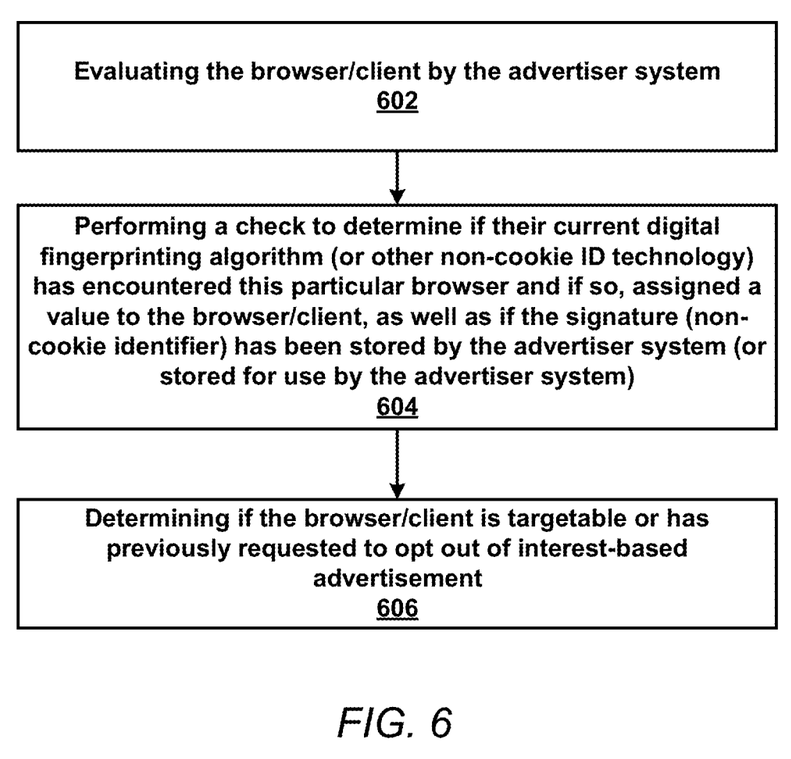
FIG. 6 is a flow chart of an example method for generating a response for an opt-out request.

Turning briefly to FIG. 6, a method for generating a response for an opt-out request is illustrated.

In general, this method can be used verify that the opt-out end point advertiser system has opted a consumer out from being served targeted interest-based advertisements by setting an "opt-out" cookie on the client's browser. This action reports success or failure and is based on the actual presence (or non-presence) of the opt-out cookie in the client's browser. Verification of the presence of the "opt-out" cookie is usually accomplished by redirecting to the opt-out end point advertiser system and receiving by the server a response from the opt-out end point advertiser system, before redirecting the response back to the client. If utilizing a non-cookie technology for interest based advertising (e.g., statistical identifiers), the opt-out is persisted on the advertiser's system 130, in some embodiments. The advertiser system 130 is also referred to as an opt-out end point system. That is, some advertisers utilize a specific URL that points to an end point, which is specifically designed to handle opt-out requests.

The method includes the advertiser system evaluating 602 the browser/client and performing 604 a check to determine if their current non-cookie identification technology (sometimes a digital fingerprinting algorithm) has encountered this particular browser and if so, assigned a value to the browser/ client, as well as if the signature (statistical identifier) has been stored by the advertiser system (or stored for use by the advertiser system).

Next, the method includes the advertiser system determining 606 if the browser/client 105 is targetable or has previously requested to opt-out of interest-based advertisement.

Returning back to FIG. 5, the advertiser system returns 514 a response (status check response returned) to the server 110 as to whether the browser/client is targetable with non-cookie technology or has previously requested to opt-out of interest-based advertisement with non-cookie technology.

Figure 7:
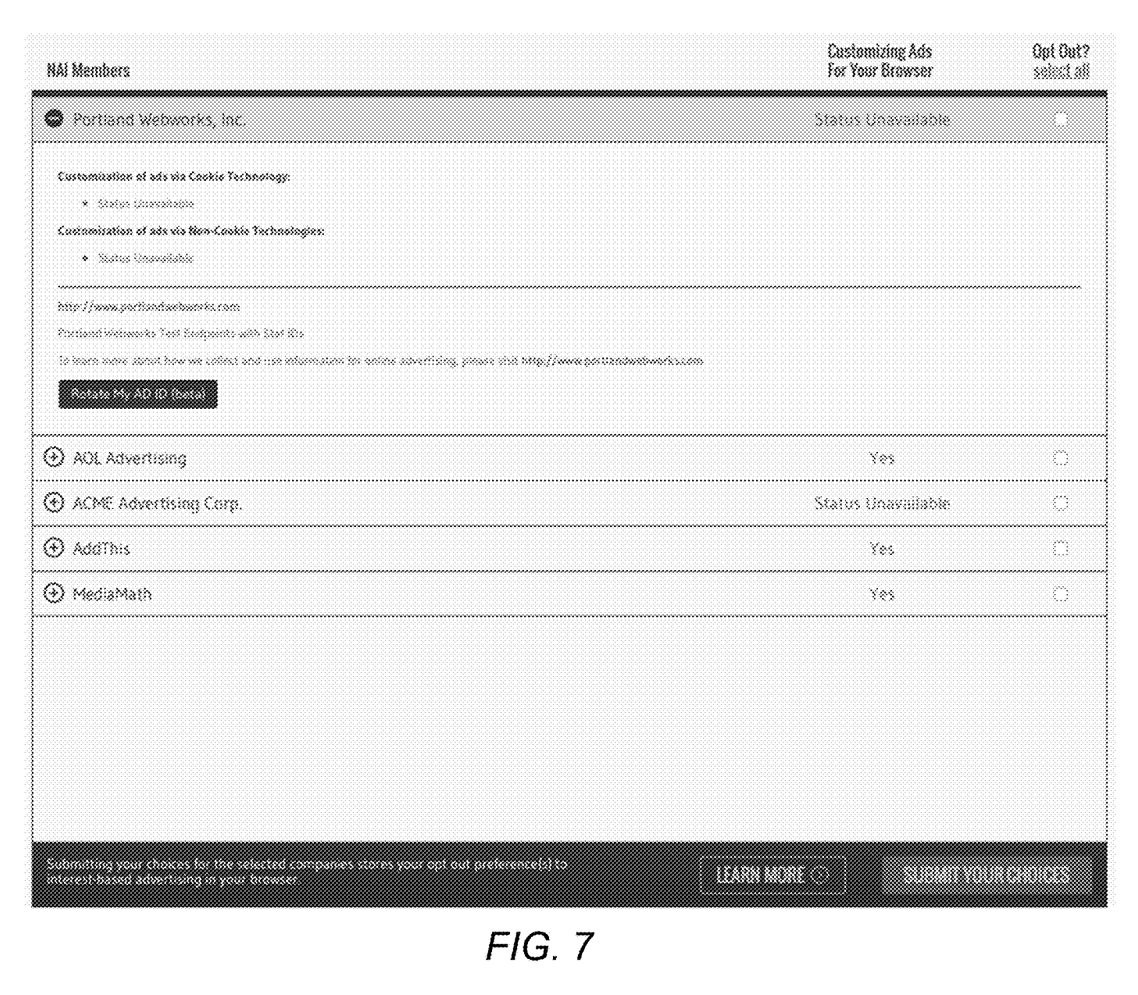
FIG. 7 is a GUI in the form of a response GUI that indicates if a client is being tracked and targeted with non-cookie technologies.

The server 110 then transmits 516 this response in a GUI format for client review. An example response GUI is illustrated in FIG. 7.

After the client sees which advertiser systems are using non-cookie technologies (such as digital fingerprinting) and/or if the user is opted out with these advertisers, the user can manage their opt-outs by selecting advertisers that provide non-cookie (such as server-side) tracking technologies.

The client can request an opt-out which applies to non-cookie browser-identification technologies for interest-based advertising.

In some embodiments, certain browsers do not allow for third party cookies, by default. This default blocking can deleteriously affect the placement of opt-out cookies. The present disclosure can be utilized to set an opt-out cookie when a browser's inherent third party cookie blocking abilities are active by a process, as defined in FIG. 8.

Figure 8:
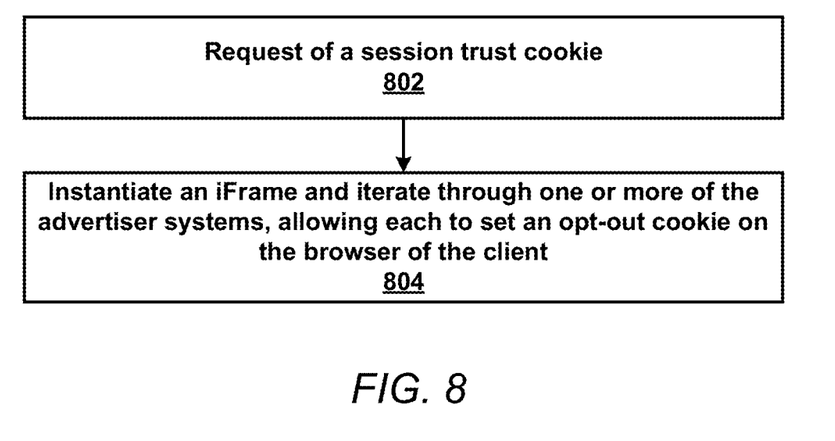
FIG. 8 is a flow chart of a method for enabling opt-out procedures in browsers that prevent cookies being set in a third-party relationship.

FIG. 8 illustrates a process for enabling opt-out procedures in browsers that prevent cookies being set in a third-party relationship. The method includes the request 802 of a session trust cookie. The advertisers can be pre-configured to respond to requests for session cookies that enable the browser to trust the setting of subsequent opt-out cookies using an Action ID that is unique for setting a session "trust" cookie.

The purpose of the session trust cookie is to gain the browser's trust, allowing the server 110 to instantiate an iFrame and initiation of an opt-out process as though the browser allows for the setting of opt-out cookies in a "from visited" context. To be sure, if the advertiser were to attempt to set a third party cookie, the browser would refuse. This new trusted relationship with the browser can be characterized (and sometimes referred to) as a "from visited" relationship.

The request, known as Action_id=5, is used when a browser is configured to block setting of cookies in a third party context, but allows setting third party cookies from sites "previously visited."

The purpose of this request is to set a session cookie so that a temporary trust relationship is created with the browser and the opt-out end point advertiser system that sets the session cookie. The session cookies set during this process will engender trust, creating a "from visited" context between the opt-out end point advertiser system and the client. As a result of the trust being established through the session trust cookie a subsequent opt-out request (action_id=4) will enable participating advertisers to set an opt-out cookie in a "from visited" context. Again, the "from visited" context is created using an Action_id=5 request, and the opt-out cookie is set using a subsequent Action_id=4 request.

If the browser does not already have a first cookie set from the advertising system (which engage in advertising as opposed to managing opt-out requests), this process creates a trust relationship. If a trust relationship is created as a part of this process, the advertiser may indicate this in a cookie value or to store this signal on their systems.

An example request includes: http://your.domain/endpoint?action_id=5&nocache=223442. Example headers for the request are illustrated in Table 2.

TABLE 2

| Attribute | Description/value |
|---|---|
| Referer | http://<dev \| staging \| qa \| integrate \| www \| optout>.networkadvertising.org/* |
| Accept | text/html,application/xhtml+xml |

Example URL parameters are illustrated in Table 3.

TABLE 3

| Field | Data Type | Description |
|---|---|---|
| action_id | string | value "5" indicates establish temporary trust by setting a session cookie. |
| nocache | string | Ignore: cache buster |

Next, the server 110 instantiates (through the tool/application) 804 an iFrame and iterate through each participating advertiser system 130, allowing each opt-out end point advertiser system that has trust with the browser to set an opt-out cookie on the browser of the client 105.

In some embodiments, the opt-out cookie can cover both cookie-based technology and non-cookie based technologies (assuming a "from visited" relationship exists as described above). It will be understood that while the server 110 uses presence of the opt-out cookie to demonstrate the user's choice has been recorded in the opt-out cookie, the opt-out functionality has covered the advertiser's use of statistical identifiers for interest-based advertising (IBA).

Optional guidelines for session trust cookies can be established such as the session trust cookie having a different value from any of the opt-out cookie, IBA cookies, and ADR cookies. The session trust cookies may be a session cookie where no expiration is set.

The session trust cookie name and value may be generic values that represent its use as a trust-establishing cookie. An example includes name="FPtrust" and value="1." If a business model of the advertiser requires knowing whether cookies existed prior to the creation of the first party relationship, the trust cookie's value may indicate if cookies previously existed on the end point system.

Various optional guidelines for responses can be established such as requiring a single HTTP 200 response, as well as requiring cookies to be set using HTTP headers.

In some embodiments, the server 110 can implement response time thresholds. For example, responses can be required to be below 250 ms. The timeout for the step is very low and it is important that an adequate response time is maintained on all member endpoints. These thresholds improve the user experience and prevent latency.

Figure 9:
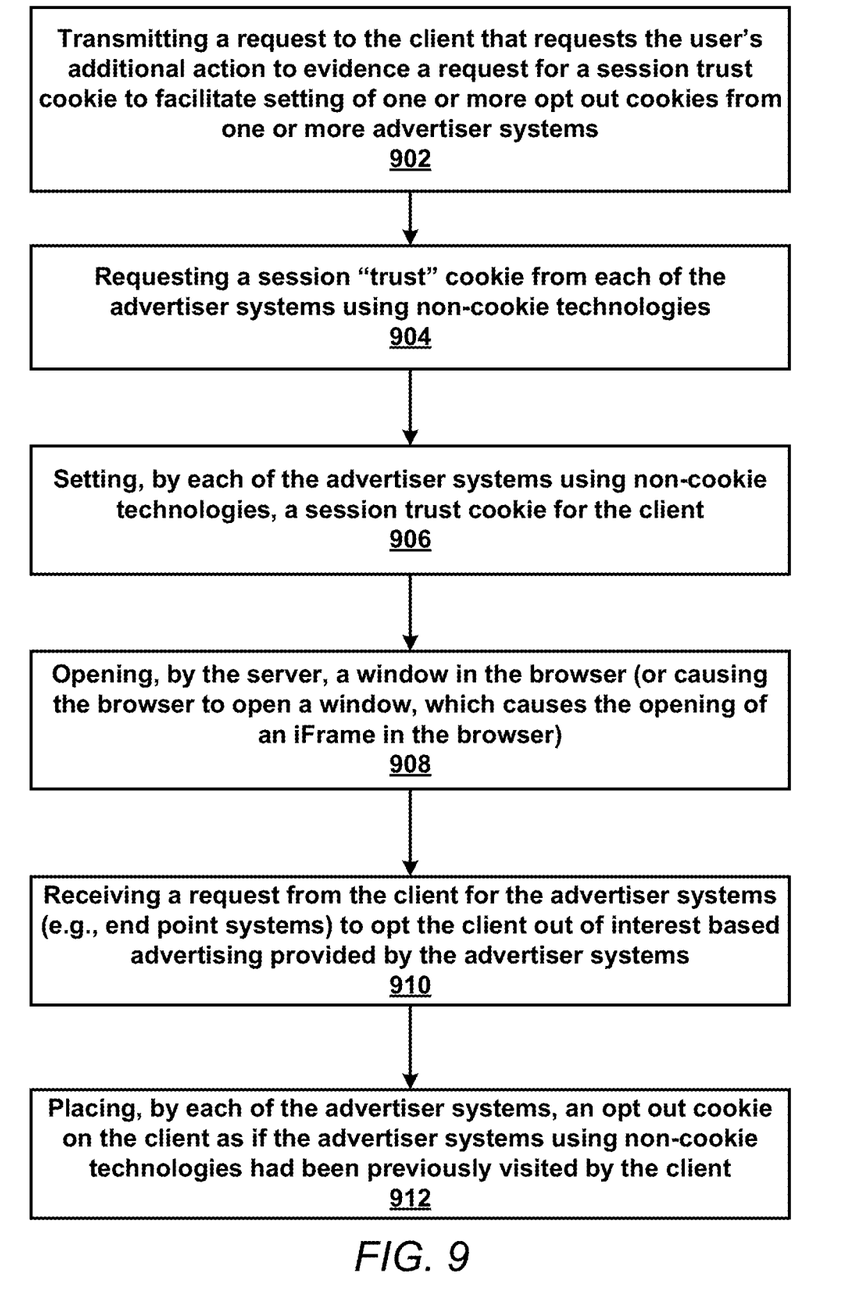
FIG. 9 is a flow chart that illustrates a method for setting a session trust cookie on a client.

FIG. 9 is another flowchart of an example method of the present disclosure. The method includes the server transmitting 902 a request to the client that requests the user's additional action to evidence a request for a session trust cookie to facilitate setting of one or more opt-out cookies from one or more opt-out end point advertiser systems.

Next, the method includes the server requesting 904 a session "trust" cookie from each of the advertiser systems (e.g., participating members). Again, as mentioned above, this is facilitated through the use of a new Action ID=5, which is a new process executed between the server and advertiser systems in order to accommodate for the placement and verification of a session trust cookie.

The method then includes setting 906, by each of the advertiser systems a session trust cookie for the client. The browser of the client will then recognize any advertiser system that placed a session trust cookie as a "trusted" system having "from visited" status. Again, this places the advertiser system in a "from visited" relationship with the client, rather than a third party relationship. Indeed, the browser would reject any cookie placement by the advertiser system if the browser considered the advertiser system to be a third party, rather than having a "from visited" relationship.

Next, the method includes opening 908, by the server, a window in the browser, which causes the opening of an iFrame in the browser. The iFrame causes a redirect of the browser to each advertiser system as though they were "trusted" as having "from visited" status.

The method includes, in some embodiments, receiving 910 a request from the client for the advertiser systems (e.g., end point systems) to opt the client out of interest based advertising provided by the advertiser systems.

The method can include each of the advertiser systems placing 912 an opt-out cookie on the advertiser systems as though they had been visited by the client.

The user can then navigate the client away from the server with their opt-out cookies in place.

FIG. 10 is a diagrammatic representation of an example machine in the form of a computer system 1, within which a set of instructions for causing the machine to perform any one or more of the methodologies discussed herein may be executed. In various example embodiments, the machine operates as a standalone device or may be connected (e.g., networked) to other machines. In a networked deployment, the machine may operate in the capacity of a server or a client machine in a server-client network environment, or as a peer machine in a peer-to-peer (or distributed) network environment. The machine may be a personal computer (PC), a tablet PC, a set-top box (STB), a personal digital assistant (PDA), a cellular telephone, a portable music player (e.g., a portable hard drive audio device such as an Moving Picture Experts Group Audio Layer 3 (MP3) player), a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 1 includes a processor or multiple processors 5 (e.g., a central processing unit (CPU), a graphics processing unit (GPU), or both), and a main memory 10 and static memory 15, which communicate with each other via a bus 20. The computer system 1 may further include a video display 35 (e.g., a liquid crystal display (LCD)). The computer system 1 may also include an alpha-numeric input device(s) 30 (e.g., a keyboard), a cursor control device (e.g., a mouse), a voice recognition or biometric verification unit (not shown), a drive unit 37 (also referred to as disk drive unit), a signal generation device 40 (e.g., a speaker), and a network interface device 45. The computer system 1 may further include a data encryption module (not shown) to encrypt data.

The disk drive unit 37 includes a computer or machine-readable medium 50 on which is stored one or more sets of instructions and data structures (e.g., instructions 55) embodying or utilizing any one or more of the methodologies or functions described herein. The instructions 55 may also reside, completely or at least partially, within the main memory 10 and/or within the processors 5 during execution thereof by the computer system 1. The main memory 10 and the processors 5 may also constitute machine-readable media.

The instructions 55 may further be transmitted or received over a network via the network interface device 45 utilizing any one of a number of well-known transfer protocols (e.g., Hyper Text Transfer Protocol (HTTP)). While the machine-readable medium 50 is shown in an example embodiment to be a single medium, the term "computer-readable medium" should be taken to include a single medium or multiple media (e.g., a centralized or distributed database and/or associated caches and servers) that store the one or more sets of instructions. The term "computer-readable medium" shall also be taken to include any medium that is capable of storing, encoding, or carrying a set of instructions for execution by the machine and that causes the machine to perform any one or more of the methodologies of the present application, or that is capable of storing, encoding, or carrying data structures utilized by or associated with such a set of instructions. The term "computer-readable medium" shall accordingly be taken to include, but not be limited to, solid-state memories, optical and magnetic media, and carrier wave signals. Such media may also include, without limitation, hard disks, floppy disks, flash memory cards, digital video disks, random access memory (RAM), read only memory (ROM), and the like. The example embodiments described herein may be implemented in an operating environment comprising software installed on a computer, in hardware, or in a combination of software and hardware.

One skilled in the art will recognize that the Internet service may be configured to provide Internet access to one or more computing devices that are coupled to the Internet service, and that the computing devices may include one or more processors, buses, memory devices, display devices, input/output devices, and the like. Furthermore, those skilled in the art may appreciate that the Internet service may be coupled to one or more databases, repositories, servers, and the like, which may be utilized in order to implement any of the embodiments of the disclosure as described herein.

While this technology is susceptible of embodiment in many different forms, there is shown in the drawings and will herein be described in detail several specific embodiments with the understanding that the present disclosure is to be considered as an exemplification of the principles of the technology and is not intended to limit the technology to the embodiments illustrated.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

It will be understood that like or analogous elements and/or components, referred to herein, may be identified throughout the drawings with like reference characters. It will be further understood that several of the figures are merely schematic representations of the present disclosure. As such, some of the components may have been distorted from their actual scale for pictorial clarity.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the present disclosure in the form disclosed. Many modifications and variations will be apparent to those of ordinary skill in the art without departing from the scope and spirit of the present disclosure. Example embodiments were chosen and described in order to best explain the principles of the present disclosure and its practical application, and to enable others of ordinary skill in the art to understand the present disclosure for various embodiments with various modifications as are suited to the particular use contemplated.

Aspects of the present disclosure are described above with reference to flowchart illustrations and/or block diagrams of methods, apparatus (systems) and computer program products according to embodiments of the present disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While specific embodiments of, and examples for, the system are described above for illustrative purposes, various equivalent modifications are possible within the scope of the system, as those skilled in the relevant art will recognize. For example, while processes or steps are presented in a given order, alternative embodiments may perform routines having steps in a different order, and some processes or steps may be deleted, moved, added, subdivided, combined, and/or modified to provide alternative or sub-combinations. Each of these processes or steps may be implemented in a variety of different ways. Also, while processes or steps are at times shown as being performed in series, these processes or steps may instead be performed in parallel, or may be performed at different times.

While various embodiments have been described above, it should be understood that they have been presented by way of example only, and not limitation. The descriptions are not intended to limit the scope of the invention to the particular forms set forth herein. To the contrary, the present descriptions are intended to cover such alternatives, modifications, and equivalents as may be included within the spirit and scope of the invention as defined by the appended claims and otherwise appreciated by one of ordinary skill in the art. Thus, the breadth and scope of a preferred embodiment should not be limited by any of the above-described example embodiments.

What is claimed is:

1. A method, comprising:
    gaining trust of a browser of a client by setting a first session cookie;
    instantiating, by a server, an iFrame on the browser; and
    iterating through a plurality of end point systems through the iFrame so as to allow each of the plurality of end point systems to set a second trusted opt-out cookie on the browser of the client.

2. The method according to claim 1, wherein placement of the second trusted opt-out cookie places an end point system of the plurality of end point systems in a "from visited" context with the client as if the client had previously visited the end point system.

3. The method according to claim 2, further comprising:
    receiving an indication that each of the end point systems is using a non-cookie browser identification processes; and
    receiving end point details for each of the end point systems.

4. The method according to claim 3, further comprising performing a baseline test of each of the end point systems with respect to their ability to provide opt-out features to the client.

5. The method according to claim 4, further comprising persisting an opt-out of the client on one or more of the plurality of end point systems if the one or more of the plurality of end point systems is using non-cookie browser identification processes.

6. The method according to claim 1, wherein gaining trust of a browser of a client by setting a first session cookie includes using an action_id=5 request, and the trusted opt-out cookie is placed using an action_id=4 request.

7. The method according to claim 1, further comprising identifying the client as having an enhanced trust relationship with one or more of the plurality of end points by using a cookie value or storing information indicative of the enhanced trust relationship on the one or more of the plurality of end points, which prevents setting any additional cookies for the client.

8. The method according to claim 1, further comprising implementing response time thresholds for the each of the plurality of end point systems that reference a time for responding to opt-out requests.

9. The method according to claim 1, further comprising verifying an opt-out status of the client with at least one of the plurality of end point systems.

10. A method, comprising:
executing an onboarding process by delivering to an end point system a means for specifying if the end point system is using non-cookie tracking technology, as well as opt-out cookies;
receiving from the end point system any of opt-out cookie values, an end point system URL, a privacy policy URL, a description of a company associated with the end point system, and an advertisement ID rotation URL;
receiving end point details specify an opt-out infrastructure for the end point system;
performing a baseline test of the end point system's capabilities to provide opt-out features using the end point details; and
notifying the end point system of approval or disapproval based on the baseline test.

11. A system, comprising:
a processor and memory for storing executable instructions comprising an opt out application, the processor executing the opt out application to:
gain trust of a browser of a client by setting a first session cookie;
instantiate an iFrame on the browser; and
iterating through a plurality of end point systems through the iFrame so as to allow each of the plurality of end point systems to set a second trusted opt-out cookie on the browser of the client.

12. The system according to claim 11, wherein placement of the second trusted opt-out cookie places an end point system of the plurality of end point systems in a "from visited" context with the client as if the client had previously visited the end point system.

13. The system according to claim 12, wherein the processor further executes the opt out application to:
receive an indication that each of the end point systems is using a non-cookie browser identification processes; and
receive end point details for each of the end point systems.

14. The system according to claim 13, wherein the processor further executes the opt out application to perform a baseline test of each of the end point systems with respect to their ability to provide opt-out features to the client.

15. The system according to claim 14, wherein the processor further executes the opt out application to persist an opt-out of the client on one or more of the plurality of end point systems if the one or more of the plurality of end point systems is using non-cookie browser identification processes.

16. The system according to claim 11, wherein the trust of the browser of the client is gained by the system setting a first session cookie includes using an action_id=5 request, and the trusted opt-out cookie is placed using an action_id=4 request.

17. The system according to claim 11, wherein the processor further executes the opt out application to identify the client as having an enhanced trust relationship with one or more of the plurality of end points by using a cookie value or storing information indicative of the enhanced trust relationship on the one or more of the plurality of end points, which prevents setting any additional cookies for the client.

18. The system according to claim 11, wherein the processor further executes the opt out application to implement response time thresholds for the each of the plurality of end point systems that reference a time for responding to opt-out requests.

19. The system according to claim 11, wherein the processor further executes the opt out application to verify an opt-out status of the client with at least one of the plurality of end point systems.

* * * * *